W. M. METCALF.
SELF PROPELLED VEHICLE.
APPLICATION FILED MAR. 13, 1920.

1,404,462.

Patented Jan. 24, 1922.
7 SHEETS—SHEET 7.

Inventor:
Walter Miller Metcalf.
Attorney: R Hadden

UNITED STATES PATENT OFFICE.

WALTER MILLER METCALF, OF LIVERPOOL, ENGLAND.

SELF-PROPELLED VEHICLE.

1,404,462.  Specification of Letters Patent.  Patented Jan. 24, 1922.

Application filed March 13, 1920. Serial No. 365,540.

*To all whom it may concern:*

Be it known that I, WALTER MILLER METCALF, a subject of the King of England, of Liverpool, England, have invented certain new and useful Improvements in Self-Propelled Vehicles, of which the following is a specification.

This invention relates to a self-propelled vehicle adapted for use either on land or water, or on both land and water of that type in which the propulsion is effected by means of an aerial propeller.

The invention has for its object generally to effect such improvements as will bring this type of vehicle within the range of practical possibilities, so that there is produced a road vehicle which, compared with the usual form of self-propelled vehicle, is of relatively simple construction, light in weight, cheap to construct, little liable to get out of order, comparatively noiseless in running and inexpensive to keep up and run.

The invention consists in novel constructions or arrangements of frame work and body or fuselage: in the location, arrangement and means for mounting and guarding the propeller: in means for disposal of the air slip stream from the propeller to avoid raising of dust from the roadway; in means for adapting the vehicle for running on land only, or in water only or to run as required on either land or water, and in means for taking load off the road wheels in the case of a road vehicle and off floats when adapted for water use, all as hereinafter fully described and specifically pointed out in appended claims.

Embodiments of the invention are illustrated in the accompanying drawings, wherein.

Figure 3:
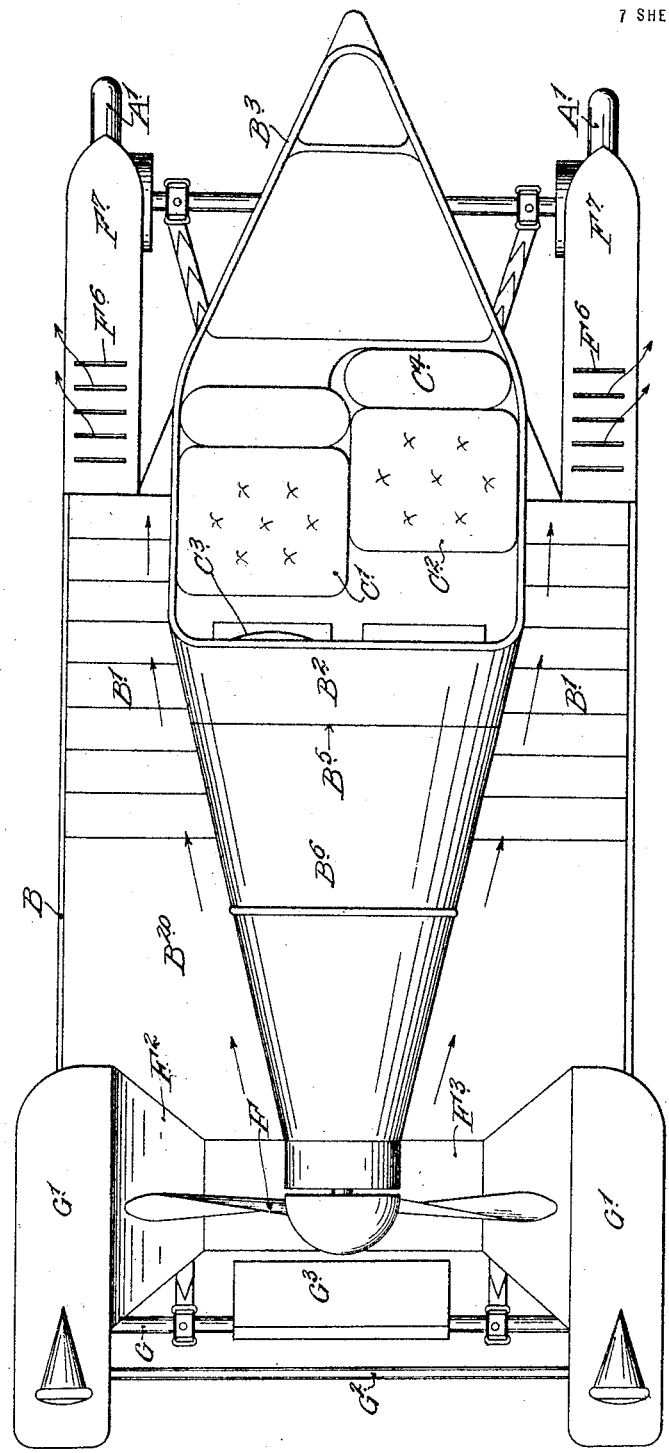

Fig. 3 a plan view with parts removed.

Figure 4:
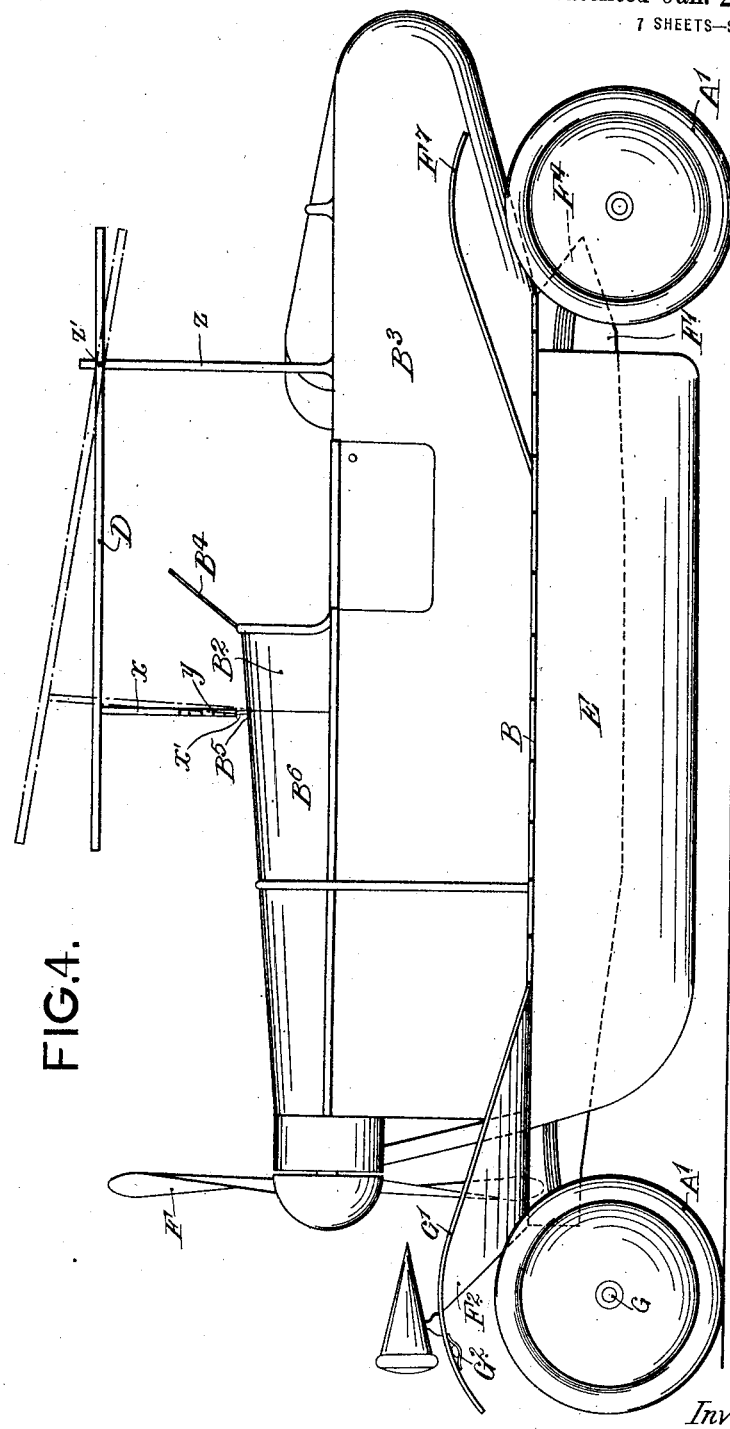
Figure 5:
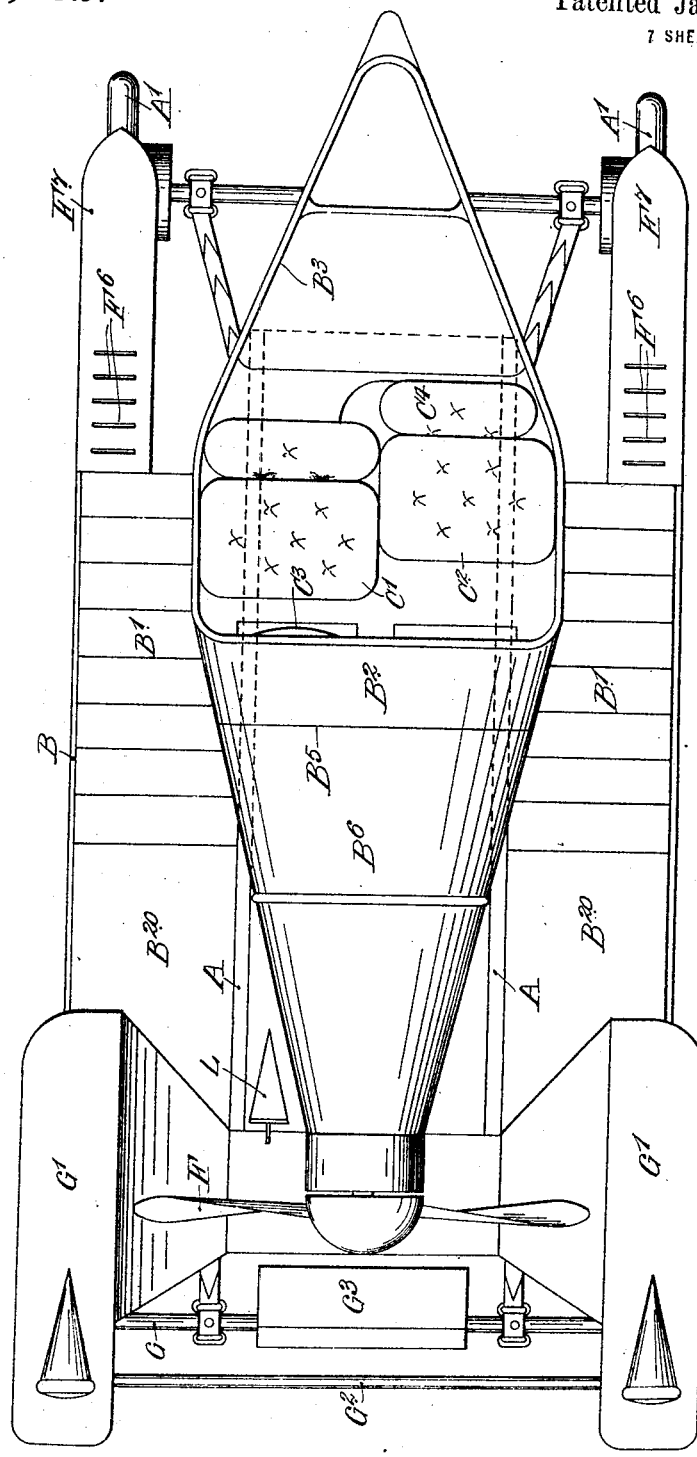

Fig. 4 is a side elevation of another form of vehicle suitable for use on both land and water, Fig. 5 is a plan view of a structure suitable both for the forms of Figs. 1 to 3 or 4.

Figure 6:
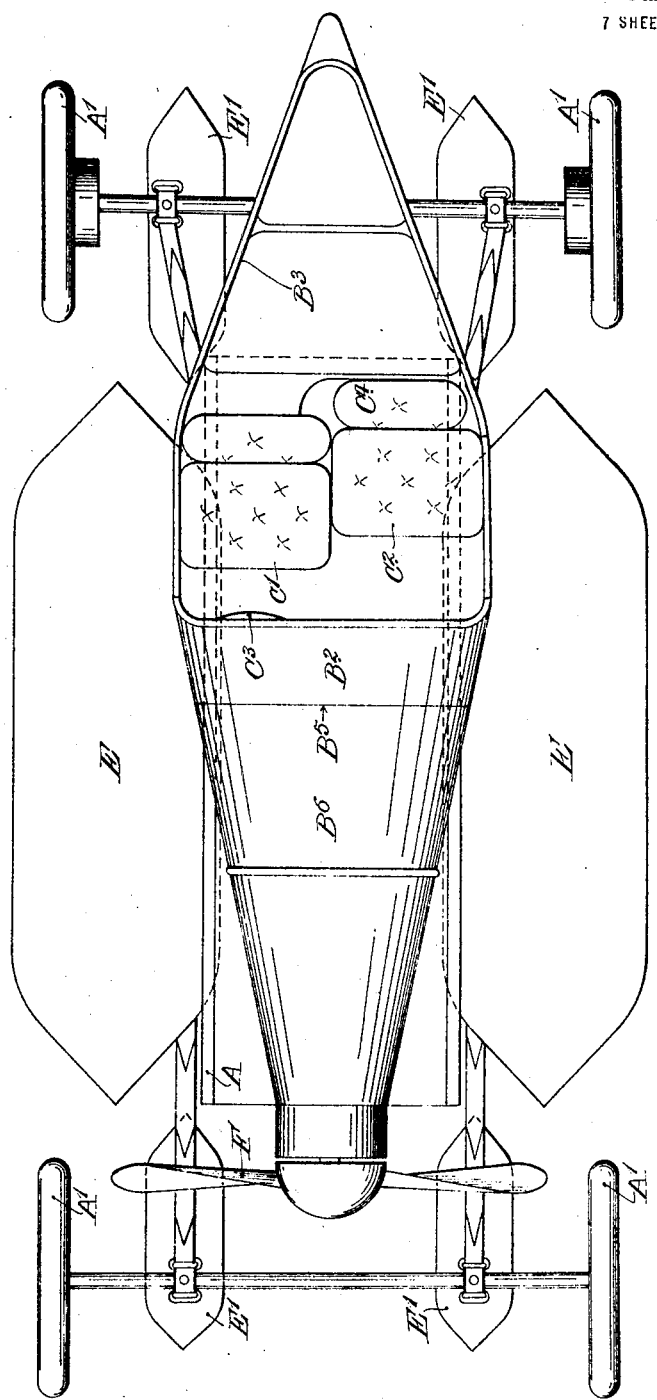

Fig. 6 is a plan view of another form of vehicle suitable for use on both land and water.

Figure 7:
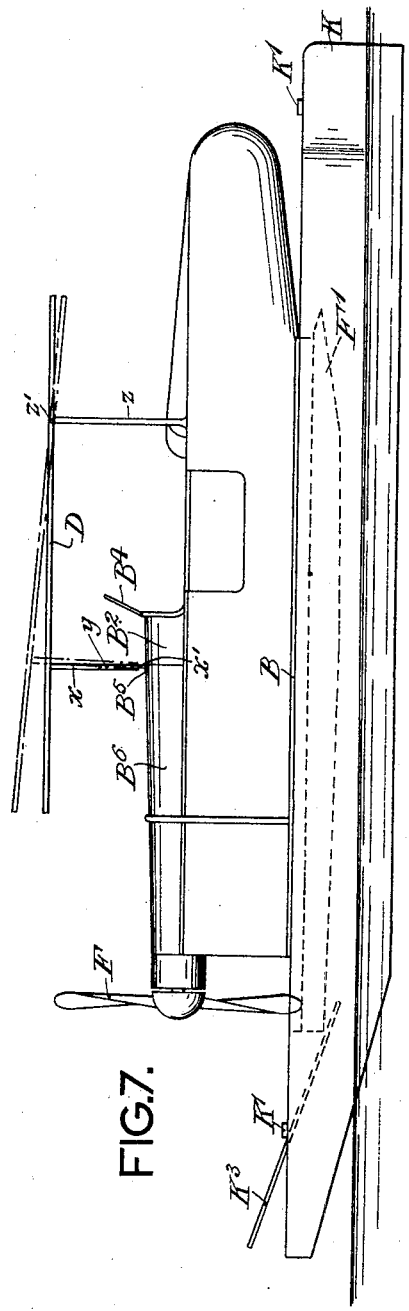
Figure 8:
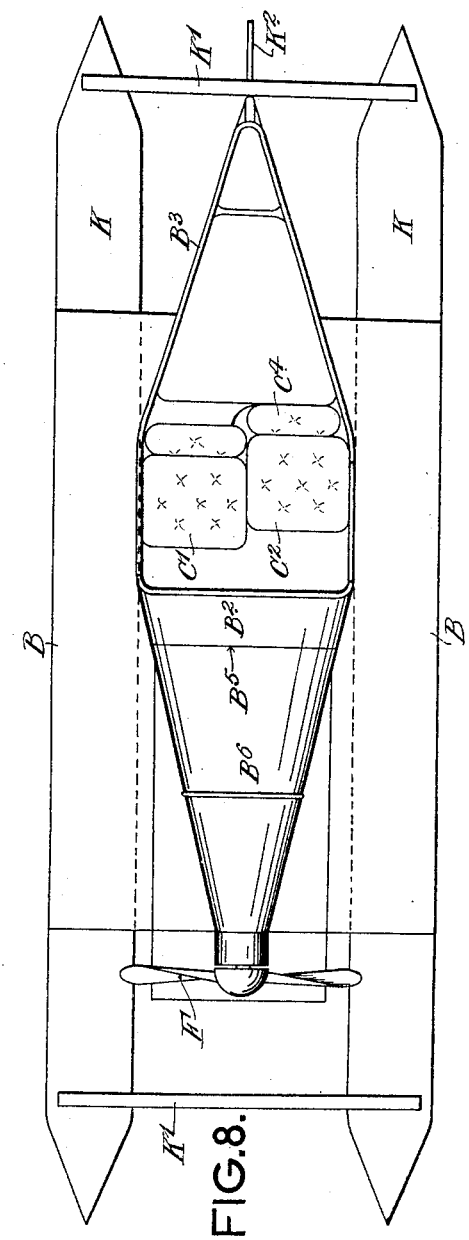

Figs. 7 and 8 are respectively side elevation and plan view of a still further form adapted for use as a hydroplane only.

To refer more particularly to Figs. 1 to 5, the frame and fuselage construction of the vehicle are in one unit. The frame work (Figs. 2 and 5) on which the wheels $A^1$ are mounted is preferably of hard wood fitted with steel edge plates, the forward part being for the mounting of the engine $A^3$, propeller F and transmission gear $A^4$. The fuselage or body framework is suitably made of light wood where possible and has for its foundation a wide deck or platform B formed as of transverse boards $B^1$. This platform is secured to the body framework $B^3$ from the underside and extends at each side of the body work as shown in Figs. 3 and 5 to form stepboards and for the purpose of preventing part of the slipstream (hereinafter referred to) from reaching the road surface. This said platform is then secured to the top of the frame A as by screwing, thus producing an exceedingly light but rigid construction as a whole.

The forward part $B^{20}$ or bonnet boards of the platform are by preference of unitary structure so that they may be readily removable to provide access to the engine.

The body or fuselage $B^3$ is of streamline form and in order to maintain said form, that part of the cowl $B^2$ immediately forward of the seat or seats $C^1 C^2$ is shaped to cover the steering wheel $C^3$ and is brought well up to the driver's seat $C^1$. In order to enable easy access to be obtained to said seat, and for general accessibility, the upper portion of said part of the cowl, on which is mounted one or more shallow transparent wind screens $B^4$, is hinged as at $B^5$ to the main part of the cowl-dash $B^6$ so that it can be turned forward, as shown in broken lines in Fig. 1.

Both the passenger's seat $C^2$ with its back rest $C^4$ are removable in order that when used as a single seater, considerable luggage space is available, together with accommodation for spare wheel and propeller if required.

Figure 1:
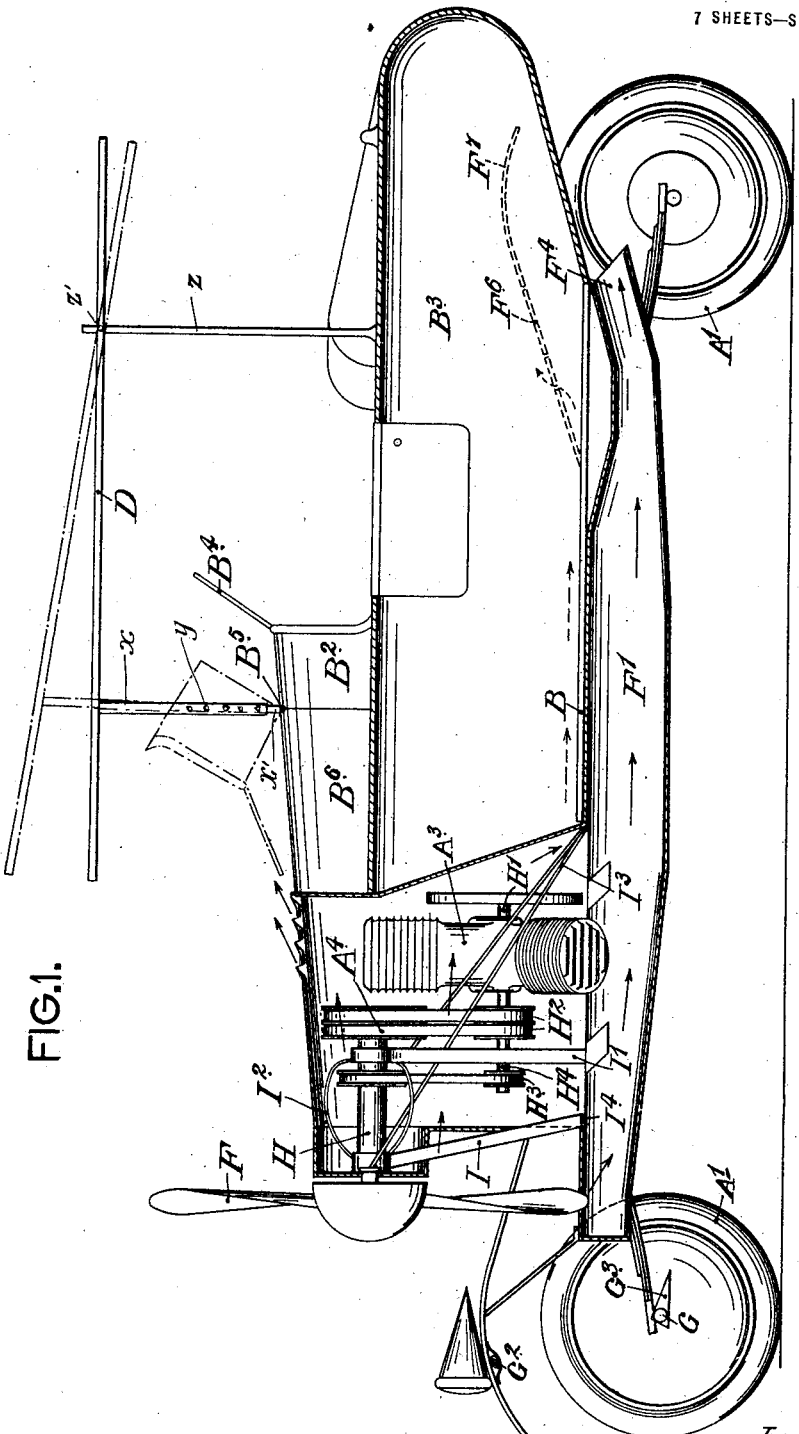
Fig. 1 is a sectional side elevation of one form of vehicle for use on the land only.
Figure 2:
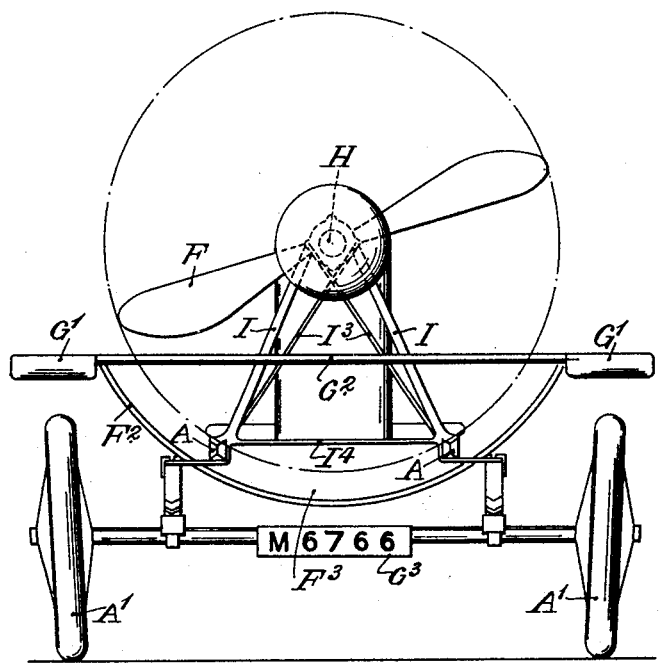
Fig. 2 is a front elevation thereof.

A detachable and adjustable canopy D having the form of an aerofoil is mounted above the body to reduce the load on the road wheels. This canopy aerofoil may be provided with adjustable extending parts X, $X^1$ held together by a pin $y$ for use when the nature of the roadway, or the character of the country is such as will permit the use of such an overhanging aerofoil, and its adjusted position as indicated in broken lines in Figs. 1 and 4 is adapted to assist in taking the load off the wheels or floats. The rear bars $z$ have the aerofoil removably attached by pins $z'$.

Detachable floats E may be fitted under the platform B above referred to as indicated in Figs. 4 and 6 and small floats or collapsible air bags $E^1$ may also be attached to the axles of the road wheels to keep them above water, as shown in Fig. 6 thereby enabling the machine to cross waterways and flooded stretches of country when required, the road wheels being preferably of the disc type allowing the machine to be steered as on land. The machine may be driven to the waterside and into the water without the pilot leaving his seat.

By dismantling the road wheel springs at their frame connection thereby casting off the axles, wheels, springs etc., the fuselage may be lowered onto long narrow floats K fitted under the platform and connected by stays $K^1$ thus converting the machine into a hydroplane, as indicated in Figs. 7 and 8, the seating accommodation and luggage carrying capacity remaining the same. In this case the steering wheel would be connected to a rudder $K^2$ located between the floats at the rear. In Fig. 7 there is also shown an additional aerofoil $K^3$ serving to reduce the load on the floats and to prevent water splashing or being drawn on to the propeller blades. This aerofoil also serves as a splashboard for the slip stream being carried below to the funnel $F^1$ hereinafter referred to.

In order to prevent the raising of dust from the roadway by the propeller F at its lowest point of rotation, either by suction or by the effect of the air slipstream, a funnel or channel $F^1$ is provided under the vehicle body which at its forward end, together with the mudguard side-wings $F^2$, is extended forward of the propeller vortex to act as a scoop $F^3$ in which the lower parts of the blades revolve and cause the air to be forced rearwards through said funnel thus cooling the engine on the way and being ejected at the back under the tail of the fuselage as at $F^4$ in an upward direction to join that part of the slipstream (mentioned below) coming along above the platform B thus preventing same from striking the roadway and also filling any vacuum which might otherwise be created and thereby assisting the streamline. The slipstream created above the platform is prevented from reaching the roadway firstly by the rear part of the forward mudguard side wings $F^2$ and then by the width of the platform B after which the forced air passes away between the rear mudguards and the body, and partly through the louvres $F^6$ in the rear mudguards $F^7$ and is directed upwards by the current of air ejected at $F^4$ at the rear of the above mentioned funnel $F^1$.

A warning device L in the form of a horn or whistle is fitted behind the propeller and is operated to receive a blast of air from same when required.

The position of the propeller F enables the necessary shielding to be carried out without rendering the construction unsightly, and the transmission mechanism employed allows of a suitable position for the engine to keep the centre of gravity as low as possible. The front axle G is carried well forward to enable the propeller to be located and its path of rotation to lie behind same and the mudguards $G^1$ are so shaped and arranged that they form side guards for the propeller and support a cross member $G^2$ serving as a safety guard well forward of the propeller. The mudguards, side-wings, slipstream scoop, front axle, streamline number plate $G^3$ carried thereby and cross member $G^2$ thus form an efficient guard for the propeller.

The power is transmitted from the engine to the propeller by means of a forward, free and reverse gear to a countershaft H immediately above the engine shaft. The forward pulley $H^2$ is shown as duplex and both this and the reverse pulley $H^3$ are fitted with internal expanding clutches the shaft $H^4$ running in line with the engine crankshaft $H^1$ with a bearing supported by a cross member between the supports $I^1$. The control is preferably arranged as a safety device in such a manner that when a pedal is depressed the propeller is free, while further pressure on said pedal will stop and then reverse the propeller so that it may be used as a brake, both on land and water and for immediately stopping the revolutions of the propeller in the most natural way in case of emergency.

The girder or cantilever frame supporting the counter-shaft H and the propeller F consist of the streamlined tubular standards I and $I^1$, cross standard $I^4$ and stays $I^2$ which connect I and $I^1$ with the bracing stays $I^3$. The whole of this framing including the engine, transmission gear, countershaft, propeller and controls may be lifted completely out of the main framing A if required to propel any kind of boat from a hydroplane to a canal barge, this unit being particularly suitable for the purpose, having a forward and reverse drive and there being no necessity for any alteration to the hull.

What I claim as my invention and desire to secure by Letters Patent of the United States is:—

1. A vehicle of the type hereinbefore specified having a unitary framework and fuselage construction comprising longitudinal frame members; a deck attached to the longitudinal frame members; a fuselage body to the underside of which are secured said longitudinal frame members and deck; an aerial propeller; and a conduit below the deck to receive part of the slip stream of air from the propeller and discharge the same at the rear of the vehicle.

2. In a vehicle of the type hereinbefore specified, the combination with a body and forward wheels and axle therefor; of an aerial propeller disposed between said wheel axle and the body; mudguards and side-wings therefor for the forward wheels adapted to form side and under guards for said propeller, and a cross member supported by said mudguards and forming a front guard for the propeller.

3. In a vehicle of the type hereinbefore specified, the combination with a body and forward and rearward wheels and axles therefor; of an aerial propeller disposed between the forward wheel axle and the body; mudguards for the forward wheels adapted to form side and under guards for said propeller; a cross member supported by said mudguards and forming a front guard for the propeller; and a conduit below the body and contiguous with said side and under guards for said propeller to receive part of the slip stream from the propeller and discharge the same at the rear of the vehicle.

4. In a vehicle of the type hereinbefore specified, the combination with a body; of an aerial propeller disposed above and forward of said body; an engine adapted to drive said propeller and disposed below the axis of said propeller; and a conduit below the body to receive part of the slip stream from the propeller and discharge it at the rear of the vehicle.

5. In a vehicle of the type hereinbefore specified, the combination with a deck; of wheels for the vehicle; an aerial propeller for driving the vehicle; mudguard side-wings for the forward wheels of the vehicle; and a conduit below the deck to receive part of the slip stream of air from the propeller and discharge it at the rear of the vehicle to avoid raising dust from the roadway, said wheel mudguard side-wings and conduit being extended forward of the propeller vortex to act as a scoop in which the lower part of the propeller revolves to cause the slipstream to be forced rearwards into said conduit.

6. In a vehicle of the type hereinbefore specified, the combination with a deck; of wheels for said vehicle; an aerial propeller for driving the vehicle; mudguard side-wings for the forward wheels of the vehicle; a conduit below the deck to receive part of the slip stream of air from the propeller and discharge it at the rear of the vehicle to avoid raising dust from the roadway, said wheel mudguard side-wings and conduit being extended forward of the propeller vortex to act as a scoop in which the lower part of the propeller revolves to cause the slipstream to be forced rearwards into said conduit; mudguards for the rear wheels; and means for disposal of air slip stream above said deck, including louvres in said rear mudguards.

7. In a vehicle of the type hereinbefore specified, the combination with a body; of an aerial propeller disposed above and forward of said body; an engine disposed below the axis of said propeller; a propeller shaft and driving means therefor; supports, of stream line form, for said shaft and driving means; stays for bracing said supports together and to the body, the disposition of the engine, propeller and driving means being such that the centre of gravity thereof is kept as low as possible; and a conduit disposed below the body for receiving part of the slip stream from said propeller and discharging it at the rear of the vehicle.

8. In a vehicle of the type hereinbefore specified, the combination with a body; of an aerial propeller disposed above and forward of said body; an engine adapted to drive said propeller and disposed below the axes of said propeller; a conduit below the body to receive part of the slip stream from the propeller and discharge it at the rear of the vehicle; and floats secured to said body and adapted for use to permit the passage of the vehicle over water.

9. In a vehicle of the type hereinbefore specified, the combination with a body; of an aerial propeller disposed above and forward of said body; an engine adapted to drive said propeller and disposed below the axes of said propeller; a conduit below the body to receive part of the slip stream from the propeller and discharge it at the rear of the vehicle; and a detachable and adjustable canopy above the body in the form of an aerofoil, adapted to take the load off the supporting means of the vehicle.

10. In a vehicle of the type hereinbefore specified, the combination of a body and running wheels; of an aerial propeller disposed between a wheel axle and the body; an engine for driving said propeller; transmission mechanism between the engine and propeller enclosed in a bonnet of conventional type as fitted to motor vehicles, with the propeller extending forwardly from said bonnet; and mudguards adapted to protect the propeller at the sides, and further protection for the propeller being afforded by the forward wheel axle and a cross member in front thereof.

In witness whereof I have signed this specification in the presence of two witnesses.

WALTER MILLER METCALF.

Witnesses:
A. J. MADDEN,
W. G. ARMAND.